US012479202B2

(12) United States Patent
Ishihara et al.

(10) Patent No.: US 12,479,202 B2
(45) Date of Patent: Nov. 25, 2025

(54) PRINTING APPARATUS

(71) Applicant: SEIKO EPSON CORPORATION, Tokyo (JP)

(72) Inventors: Kenjiro Ishihara, Shiojiri (JP); Kazuhisa Takeda, Shiojiri (JP); Keita Hanawa, Matsumoto (JP); Ryo Nishikawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 157 days.

(21) Appl. No.: 18/477,629

(22) Filed: Sep. 29, 2023

(65) Prior Publication Data

US 2024/0109285 A1 Apr. 4, 2024

(30) Foreign Application Priority Data

Sep. 30, 2022 (JP) ................................ 2022-157640

(51) Int. Cl.
*B41J 29/13* (2006.01)
*B41J 2/045* (2006.01)
*B41J 13/10* (2006.01)

(52) U.S. Cl.
CPC ........... *B41J 2/04501* (2013.01); *B41J 13/10* (2013.01); *B41J 29/13* (2013.01)

(58) Field of Classification Search
CPC ................ B41J 2203/00; B41J 2203/01; B41J 2203/011
See application file for complete search history.

(56) References Cited

U.S. PATENT DOCUMENTS

| | | | | |
|---|---|---|---|---|
| 2003/0197750 | A1 | 10/2003 | Iwatsuki et al. | |
| 2013/0215182 | A1 | 8/2013 | Yatsunami | |
| 2014/0152734 | A1* | 6/2014 | Endo | B41J 2/04556 347/16 |
| 2022/0281220 | A1* | 9/2022 | Kondo | B41J 29/02 |

FOREIGN PATENT DOCUMENTS

| | | | |
|---|---|---|---|
| JP | H11-227176 | A | 8/1999 |
| JP | 2003-311938 | A | 11/2003 |
| JP | 2013-169707 | A | 9/2013 |

* cited by examiner

*Primary Examiner* — Scott A Richmond
(74) *Attorney, Agent, or Firm* — Dority & Manning, P.A.

(57) ABSTRACT

A printing apparatus includes a head that faces a medium supported by a medium support unit and ejects a liquid, an interference object sensor including a detector that detects an interference object with the head, and a cover that can switch the detector to a shielded state and to an exposed state.

3 Claims, 6 Drawing Sheets

PRINTING APPARATUS

The present application is based on, and claims priority from JP Application Serial Number 2022-157640, filed Sep. 30, 2022, the disclosure of which is hereby incorporated by reference herein in its entirety.

BACKGROUND

1. Technical Field

The present disclosure relates to a printing apparatus, such as a printer or the like.

2. Related Art

For example, as disclosed in JP-A-2003-311938, there is an ink jet printer, which is an example of a printing apparatus, that performs printing by ejecting ink, which is an example of a liquid, from a printing head that is an example of a head. The printing head reciprocates in a main scanning direction to perform printing on a printing object, which is an example of a medium.

The ink jet printer is provided with a light-emitting sensor head and a photoreceptor sensor head which are examples of an interference object sensor. The light-emitting sensor head and the photoreceptor sensor head detect the interference object that may interfere with the moving printing head.

In the printing apparatus, the liquid may be dispersed in an atomized form as the printing is performed, and so-called mist may be generated. When the mist adheres to the interference object sensor, there is a risk that the interference object may not be detected.

SUMMARY

A printing apparatus for solving the above-described problem includes a head configured to face a medium supported by a medium support unit and to eject a liquid, an interference object sensor including a detector configured to detect an interference object with the head, and a cover configured to switch the detector between a shielded state and an exposed state.

DESCRIPTION OF EMBODIMENTS

Embodiment

An embodiment of a printing apparatus will be described below. The printing apparatus is, for example, an ink jet printer.

In the following description, a direction intersecting (for example, orthogonal to) a vertical direction Z is referred to as a width direction X, and a direction intersecting the vertical direction Z and the width direction X is referred to as a front-rear direction Y. One side in the width direction X is referred to as a first width direction X1, and the other side in the width direction X is referred to as a second width direction X2. One side in the front-rear direction Y is referred to as a front side Y1, and the other side in the front-rear direction Y is referred to as a rear side Y2. The upper side in the vertical direction Z is referred to as an upper side Z1, and the lower side in the vertical direction Z is referred to as a lower side Z2. The width direction X corresponds to an example of a first direction. The front-rear direction Y corresponds to an example of a second direction.

Printing Apparatus 10

Figure 1:
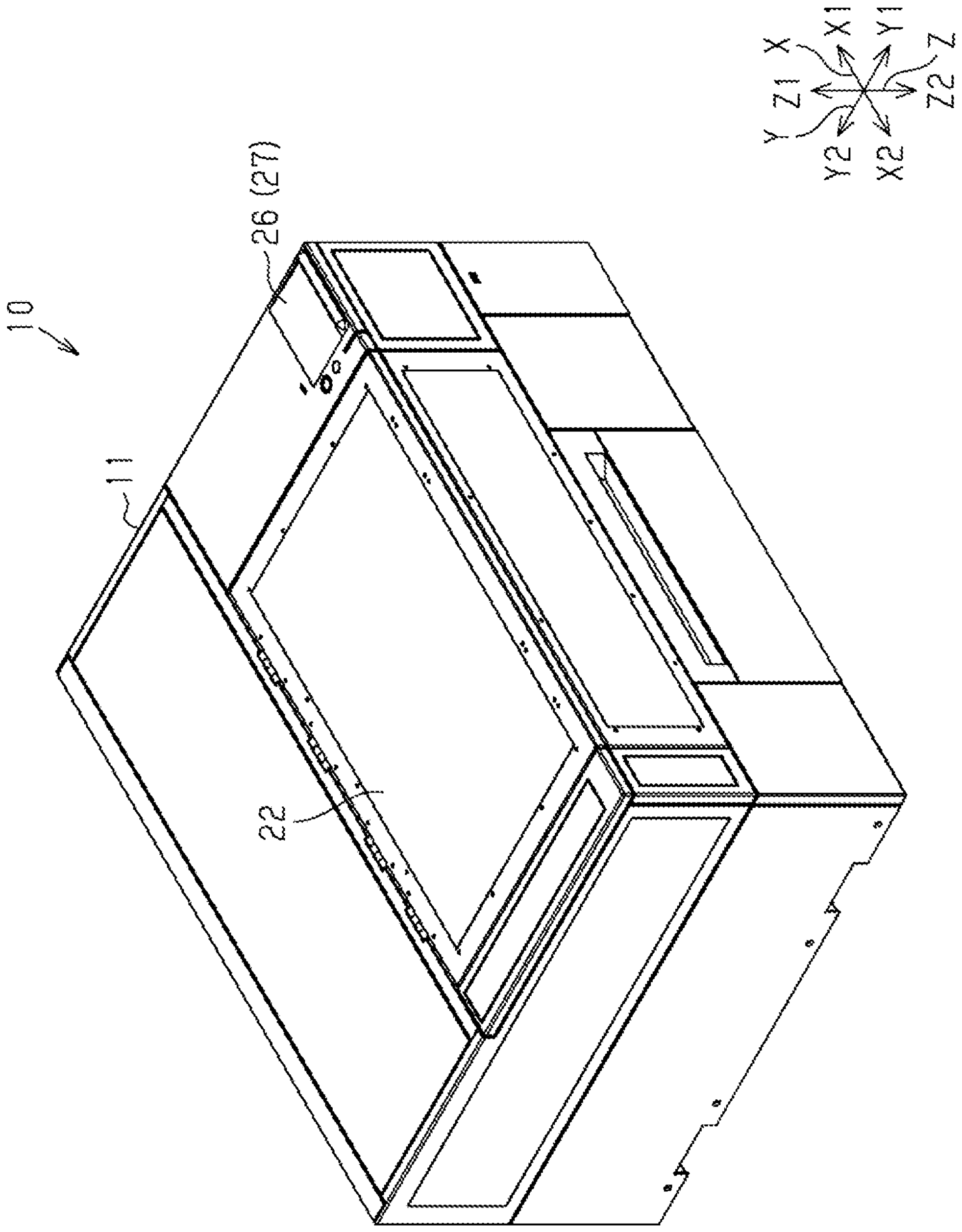
FIG. 1 is a perspective view illustrating a printing apparatus.

A printing apparatus 10 is configured to perform printing on a medium, as illustrated in FIG. 1. The printing apparatus 10 may be configured to perform the printing on a medium by ejecting a liquid. The printing apparatus 10 may be configured to perform the printing on a flexible medium, such as a T-shirt. The printing apparatus 10 may be configured such that a medium is placed in the interior thereof by a user.

The printing apparatus 10 may be provided with a housing 11, an opening/closing cover 22, a display unit 26, and an operation unit 27.

The housing 11 is configured to accommodate various members included in the printing apparatus 10. The opening/closing cover 22 is movable to a closed position illustrated in FIG. 1 and to an open position (not illustrated). When positioned at the open position, the opening/closing cover 22 exposes the various members accommodated in the housing 11. The display unit 26 is configured to display information. The operation unit 27 is configured to be operable by the user. The display unit 26 and the operation unit 27 may be integrally configured as a touch panel, or may be separately configured.

Medium Support Unit 28

Figure 2:
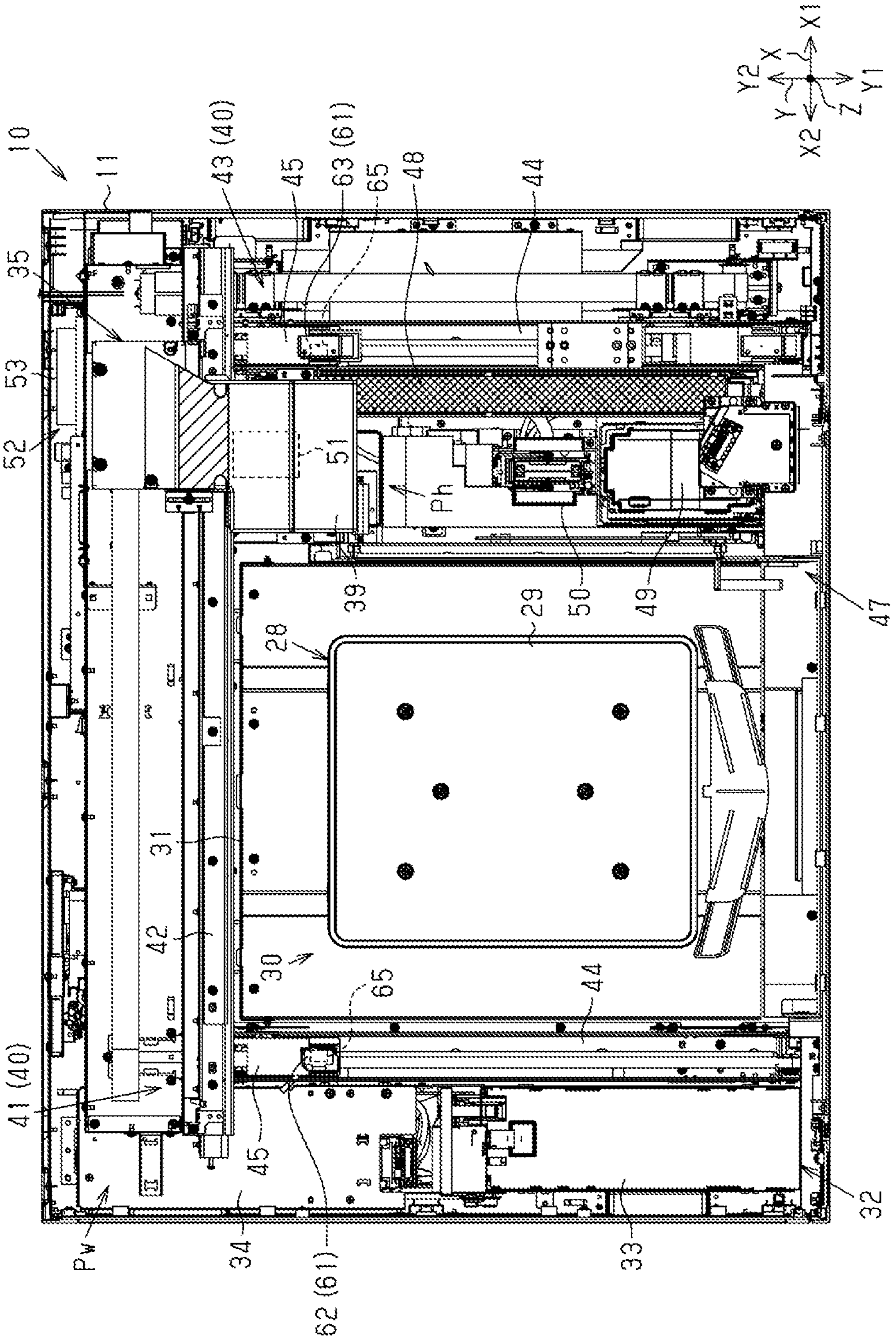
FIG. 2 is a top surface view illustrating the printing apparatus.

As illustrated in FIG. 2, the printing apparatus 10 is provided with a medium support unit 28. The medium support unit 28 is configured to support the medium. The medium support unit 28 includes the support surface 29. The support surface 29 is a surface facing the upper side Z1. That is, the vertical direction Z is a direction perpendicular to the support surface 29. The width direction X and the front-rear direction Y are directions parallel to the support surface 29. The support surface 29 is configured to support the medium. In particular, the support surface 29 is the surface that supports at least the printing region of the medium. The support surface 29 can also be referred to as a placement surface on which the medium can be placed.

The medium support unit 28 is configured not to move in the horizontal direction parallel to the support surface 29. In other words, the support surface 29 is configured not to move in the horizontal direction. The medium support unit 28 can adjust the position of the support surface 29 in the vertical direction Z.

The printing apparatus 10 may be provided with a medium accommodation unit 30. The medium accommodation unit 30 is housed in the housing 11. The medium accommodation unit 30 is provided in at least the width direction X and the front-rear direction Y of the support surface 29. When a partial region of the medium is supported by the support surface 29, the medium accommodation unit 30 can accommodate a partial region of the medium that is not supported by the support surface 29.

In particular, the medium accommodation unit 30 may be provided with an accommodation tray 31. The medium accommodation unit 30 includes regions partitioned by the accommodation tray 31. The accommodation tray 31 may define the medium accommodation unit 30 at least at the rear side Y2 of the support surface 29.

Liquid Supply Unit 32

The printing apparatus 10 may be provided with a liquid supply unit 32. The liquid supply unit 32 may be provided further in the second width direction X2 than the medium support unit 28 and the medium accommodation unit 30. The liquid supply unit 32 is configured to supply the liquid to a head 36 to be described below.

The liquid supply unit 32 may be provided with a liquid storage unit 33 and a liquid supply driving unit 34. The liquid storage unit 33 is configured to store the liquid supplied to the head 36. The liquid storage unit 33 may be a detachable cartridge, or may be a tank that can be replenished with the liquid. The top surface of the liquid storage unit 33 may be a flat surface.

The liquid supply driving unit 34 is driven to supply the liquid stored in the liquid storage unit 33 to the head 36. The liquid supply driving unit 34 may include a liquid supply pump. The top surface of the liquid supply driving unit 34 may be a flat surface.

Printing Unit 35

The printing apparatus 10 is provided with the printing unit 35. The printing unit 35 is configured to perform printing on the medium. In particular, the printing unit 35 is configured to perform the printing on the medium supported by the support surface 29.

Figure 3:
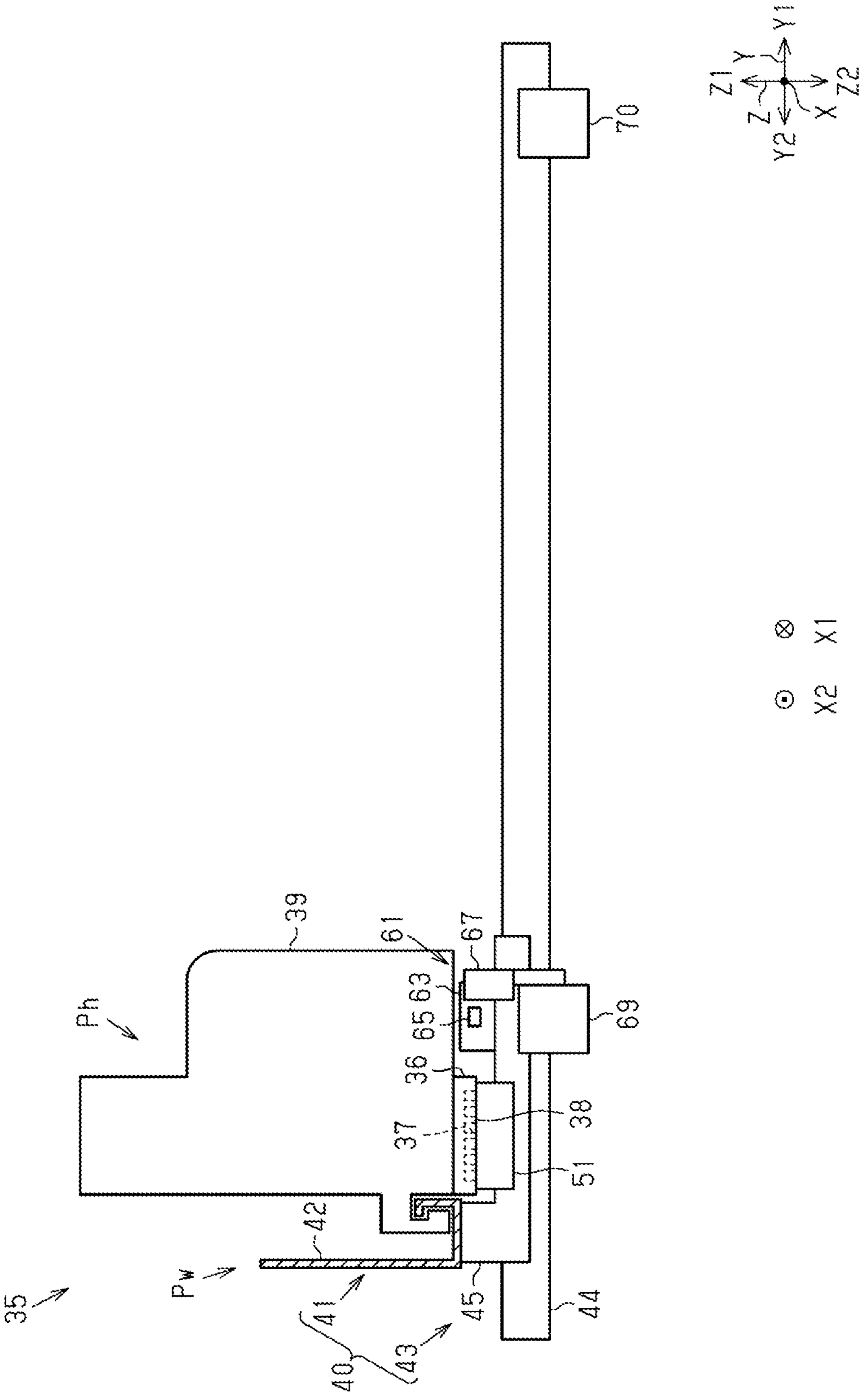
FIG. 3 is a schematic view of a printing unit illustrating a first moving unit positioned at a standby position.

As illustrated in FIG. 3, the printing unit 35 is provided with the head 36. The head 36 can eject the liquid onto the medium supported by the support surface 29. The head 36 is provided with a plurality of nozzles 37 and a nozzle surface 38. The nozzle surface 38 is a surface at which each of the plurality of nozzles 37 opens. Each of the plurality of nozzles 37 can eject the liquid. The nozzle surface 38 is positioned at a lowermost portion of the head 36, namely, furthest to the lower side Z2 of the head 36.

The printing unit 35 may be provided with a carriage 39. The carriage 39 is configured to support the head 36.

As illustrated in FIG. 2, the printing unit 35 is provided with a moving unit 40. The moving unit 40 is configured to move the carriage 39. In other words, the moving unit 40 is configured to move the head 36. The moving unit 40 is configured to move the head 36 in the horizontal direction. Specifically, the moving unit 40 is configured to move the head 36 in the width direction X and the front-rear direction Y. The head 36 of the embodiment is configured as a lateral type. In the lateral type, the printing is performed while the head 36 moves in the width direction X and the front-rear direction Y.

The moving unit 40 may be provided with a first moving unit 41. The first moving unit 41 is configured to move the carriage 39 in the width direction X. In other words, the first moving unit 41 is configured to move the head 36 in the width direction X.

The first moving unit 41 may be provided with a first guide portion 42. The first guide portion 42 is configured to extend in the width direction X over the support surface 29. The first guide portion 42 guides the carriage 39 so as to be movable along the width direction X. The carriage 39 can reciprocate in the width direction X along the first guide portion 42. That is, the carriage 39 moves the head 36 in the width direction X on the moving unit 40. It is preferable that the first guide portion 42 has a structure in which the carriage 39 is smoothly moved in the width direction X, and the carriage 39 is not easily displaced in the front-rear direction Y or the vertical direction Z.

The moving unit 40 is provided with a second moving unit 43. The second moving unit 43 is configured to support the first moving unit 41. The second moving unit 43 is configured to move the first moving unit 41 in the front-rear direction Y. In other words, the second moving unit 43 is configured to move the head 36 in the front-rear direction Y.

The second moving unit 43 may be provided with a pair of second guide portions 44. The pair of second guide portions 44 are provided in the first width direction X1 and the second width direction X2 of the medium support unit 28, with the medium support unit 28 interposed therebetween. Each of the pair of second guide portions 44 is configured to extend in the front-rear direction Y.

The second moving unit 43 may be provided with a pair of support portions 45. The pair of support portions 45 are provided in the first width direction X1 and the second width direction X2 of the medium support unit 28, with the medium support unit 28 interposed therebetween. Each of the pair of support portions 45 is configured to support the first moving unit 41. The pair of support portions 45 are movable in the front-rear direction Y along the corresponding pair of second guide portions 44. It is preferable that the second guide portion 44 has a structure in which the first moving unit 41 is smoothly moved in the front-rear direction Y, and the first moving unit 41 is not easily displaced in the width direction X or the vertical direction Z.

In this manner, the head 36 is mounted at the moving unit 40, and the moving unit 40 is movable in the front-year direction Y in a state of straddling the medium support unit 28 in the width direction X. The moving unit 40 is configured in a gate shape in a front view. The first moving unit 41 is movable to a standby position Pw illustrated in FIG. 3, to a printing position, and to an end position Pe illustrated in FIG. 5.

The standby position Pw is a position at which the first moving unit 41 stands by during non-printing. The standby position Pw is a position furthest to the rear side Y2 in a range over which the first moving unit 41 can move in the front-rear direction Y.

The printing position is a position between the standby position Pw and the end position Pe. The printing position is a position at which the head 36 faces the medium support unit 28 as a result of moving in the width direction X.

The end position Pe is a position furthest to the front side Y1 in the range over which the first moving unit 41 can move in the front-rear direction Y. The first moving unit 41 can move from the standby position Pw to the front side Y1, pass through the printing position, and move to the end position Pe. The first moving unit 41 can move from the end position Pe to the rear side Y2, pass through the printing position, and move to the standby position Pw.

Maintenance Unit 47

As illustrated in FIG. 2, the printing apparatus 10 may be provided with a maintenance unit 47. The maintenance unit 47 may be provided between the pair of second guide portions 44. The maintenance unit 47 is provided further in the first width direction X1 in than the medium support unit 28 and the medium accommodation unit 30. The maintenance unit 47 is disposed at a position that does not overlap the medium support unit 28 and the medium accommodation unit 30 in the vertical direction Z. The maintenance unit 47 may be provided so as to be aligned with the medium support unit 28 and the medium accommodation unit 30 in the width direction X. The maintenance unit 47 is configured to perform maintenance of the head 36.

The maintenance unit 47 may be provided with a flushing portion 48. The flushing portion 48 is configured to receive the liquid ejected from the head 36. The flushing portion 48 is configured to extend in the front-rear direction Y. Maintenance in which liquid is ejected from the head 36 to the flushing portion 48 is also referred to as a flushing operation. The flushing operation is maintenance in which the liquid exposed to air at the opening of the nozzle 37 is ejected as waste liquid, for the purpose of preventing and resolving clogging of the nozzle 37.

The maintenance unit 47 may be provided with a wiping portion 49. The wiping portion 49 can wipe the nozzle surface 38. Maintenance in which the wiping unit 49 wipes the head 36 is also referred to as a wiping operation.

The maintenance unit 47 may be provided with a suction portion 50. The suction portion 50 is configured to suck the liquid from the head 36. The suction portion 50 may be provided with a suction pump that sucks the liquid from the head 36. The suction portion 50 forms a closed space between the suction portion 50 and the head 36, and performs suction cleaning in which the liquid is forcibly discharged from the nozzle 37 by reducing the pressure in the closed space.

The maintenance unit 47 may be provided with a cap 51. The cap 51 is provided immediately below the head 36 positioned at a home position Ph. The cap 51 is configured to reciprocate in the vertical direction Z. The cap 51 rises and comes into contact with the head 36 to cap the head 36. The cap 51 forms a closed space between the cap 51 and the head 36, and the opening of the nozzle 37 is positioned in the closed space.

Control Board 52 and Power Supply Unit 54

The printing apparatus 10 may be provided with a control board 52. The control board 52 is accommodated in the housing 11. The control board 52 may be provided further to the rear side Y2 than the moving unit 40. The control board 52 is a board on which various electronic components for controlling the printing apparatus 10 are mounted.

The control board 52 may be provided with a control unit 53. The control unit 53 controls various operations executed by the printing apparatus 10. The control unit 53 may be configured as a circuit including $\alpha$: one or more processors that perform various processes according to a computer program, $\beta$: one or more dedicated hardware circuits that perform at least some of the various processes, or $\gamma$: a combination thereof. The hardware circuit is, for example, an application-specific integrated circuit. A processor includes a CPU and a memory such as a RAM and a ROM which stores program code or instructions configured to cause the CPU to perform processes. The memory, that is, a computer-readable medium, includes any readable medium that can be accessed by a general purpose or special purpose computer.

Interference Object Sensor 61

The printing apparatus 10 is provided with an interference object sensor 61. The interference object sensor 61 may be positioned further to the rear side Y2 than the medium support unit 28 in a state in which the first moving unit 41 is positioned at the standby position Pw. The interference object sensor 61 may be provided at the second moving unit 43. The interference object sensor 61 may be movable together with the first moving unit 41. The second moving unit 43 may move the interference object sensor 61 together with the first moving unit 41.

The interference object sensor 61 may be provided with a light projecting portion 62 and a photoreceptor portion 63. The light projecting portion 62 and the photoreceptor portion 63 may be provided at the pair of support portions 45, respectively. For example, the light projecting portion 62 may be provided at one of the support portions 45 positioned between the medium support unit 28 and the liquid supply unit 32. The photoreceptor unit 63 may be provided at the other of the support portions 45 adjacent to the maintenance unit 47 in the width direction X.

The interference object sensor 61 includes a detector 65 that detects an interference object with the head 36. The detector 65 according to the embodiment includes a light-emitting element that emits light and a photoreceptor element that receives light. The photoreceptor unit 63 includes the photoreceptor element. The light projecting unit 62 includes the light-emitting element. The optical axis connecting the light-emitting element and the photoreceptor element may be positioned at the same position as the nozzle surface 38 in the vertical direction Z.

As illustrated in FIG. 3, the printing apparatus 10 is provided with a cover 67. The cover 67 may be provided at the second moving unit 43. The cover 67 may be supported by the support portion 45 in a slidable manner.

Figure 5:
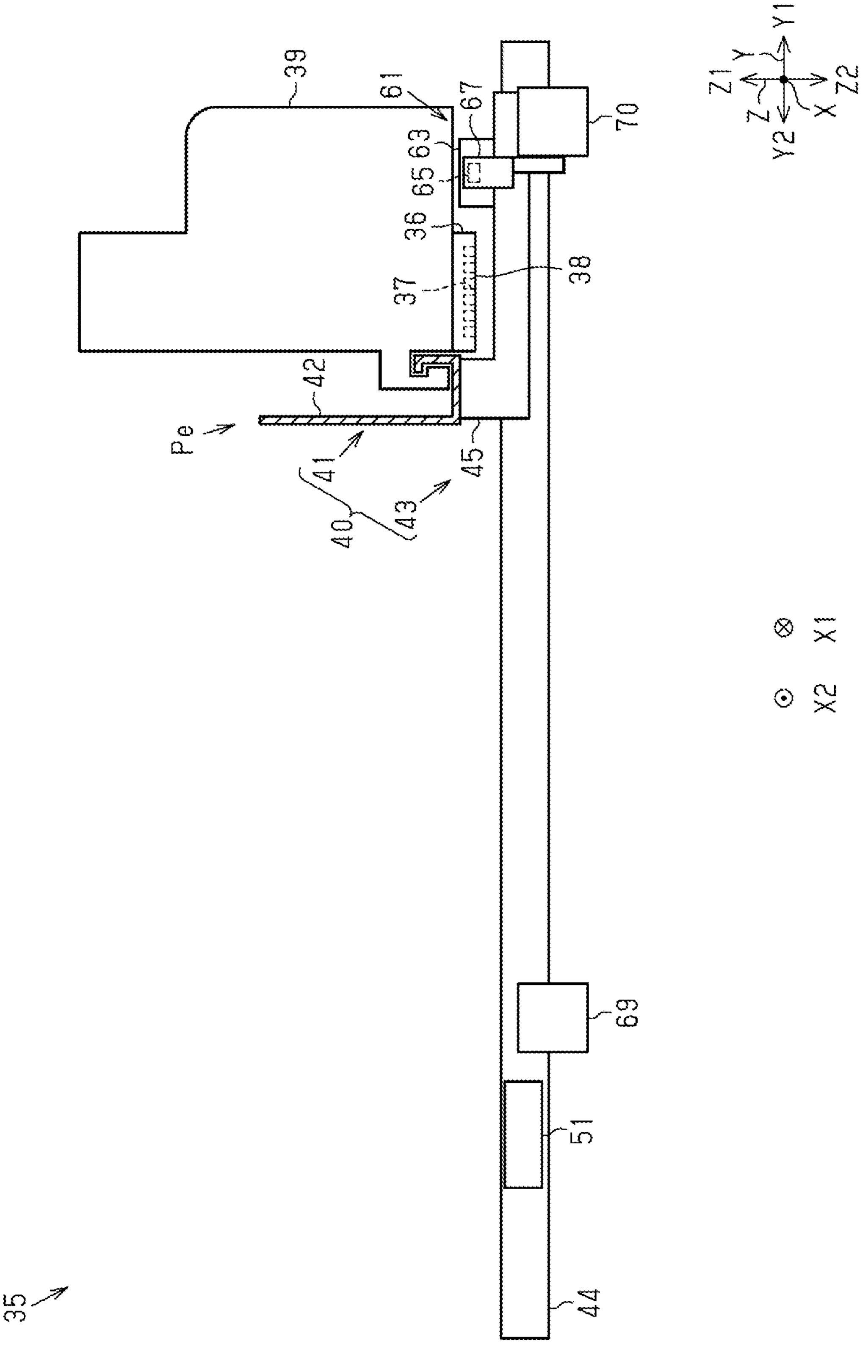
FIG. 5 is a schematic view of the printing unit illustrating the first moving unit positioned at an end position.

The cover 67 can switch the detector 65 to a shielded state illustrated in FIG. 5 and to an exposed state illustrated in FIG. 3. The cover 67 may make the switch between the shielded state and the exposed state in accordance with the movement of the moving unit 40. The shielded state is a state in which the cover 67 and the detector 65 are aligned in the width direction X, the cover 67 is positioned between the light projecting unit 62 and the photoreceptor unit 63, and the photoreceptor unit 63 cannot receive the light emitted by the light projecting unit 62. The shielded state is a state in which the cover 67 hides the detector 65 from the medium support unit 28. The exposed state is a state in which the cover 67 is displaced to the front side Y1 with respect to the detector 65, the cover 67 is not positioned between the light projecting unit 62 and the photoreceptor unit 63, and the photoreceptor unit 63 can receive the light emitted by the light projecting unit 62. The exposed state is a state in which the detector 65 is exposed to the medium support unit 28.

The printing apparatus 10 may be provided with a pair of the covers 67. The pair of covers 67 may be provided at the light projecting unit 62 and the photoreceptor unit 63, respectively. That is, one of the covers 67 may switch the detector 65 included in the light projecting unit 62 between the shielded state and the exposed state. The other of the covers 67 may switch the detector 65 included in the photoreceptor unit 63 between the shielded state and the exposed state. The configuration of the pair of covers 67 and the manner of switching the state are the same. Thus, in the following description, the cover 67 corresponding to the photoreceptor unit 63 will be described, and a description of the cover 67 corresponding to the light projecting unit 62 will be omitted.

The printing apparatus 10 may be provided with a first switching unit 69 and a second switching unit 70. The first switching unit 69 is provided further to the rear side Y2 than the second switching unit 70. The cover 67 that moves together with the first moving unit 41 is movable between the first switching portion 69 and the second switching portion 70 in the front-rear direction Y.

Actions of Embodiment

The operation of the present embodiment will be described.

As illustrated in FIG. 3, the cover 67 is in the exposure state when the first moving unit 41 is positioned at the standby position Pw.

Figure 4:
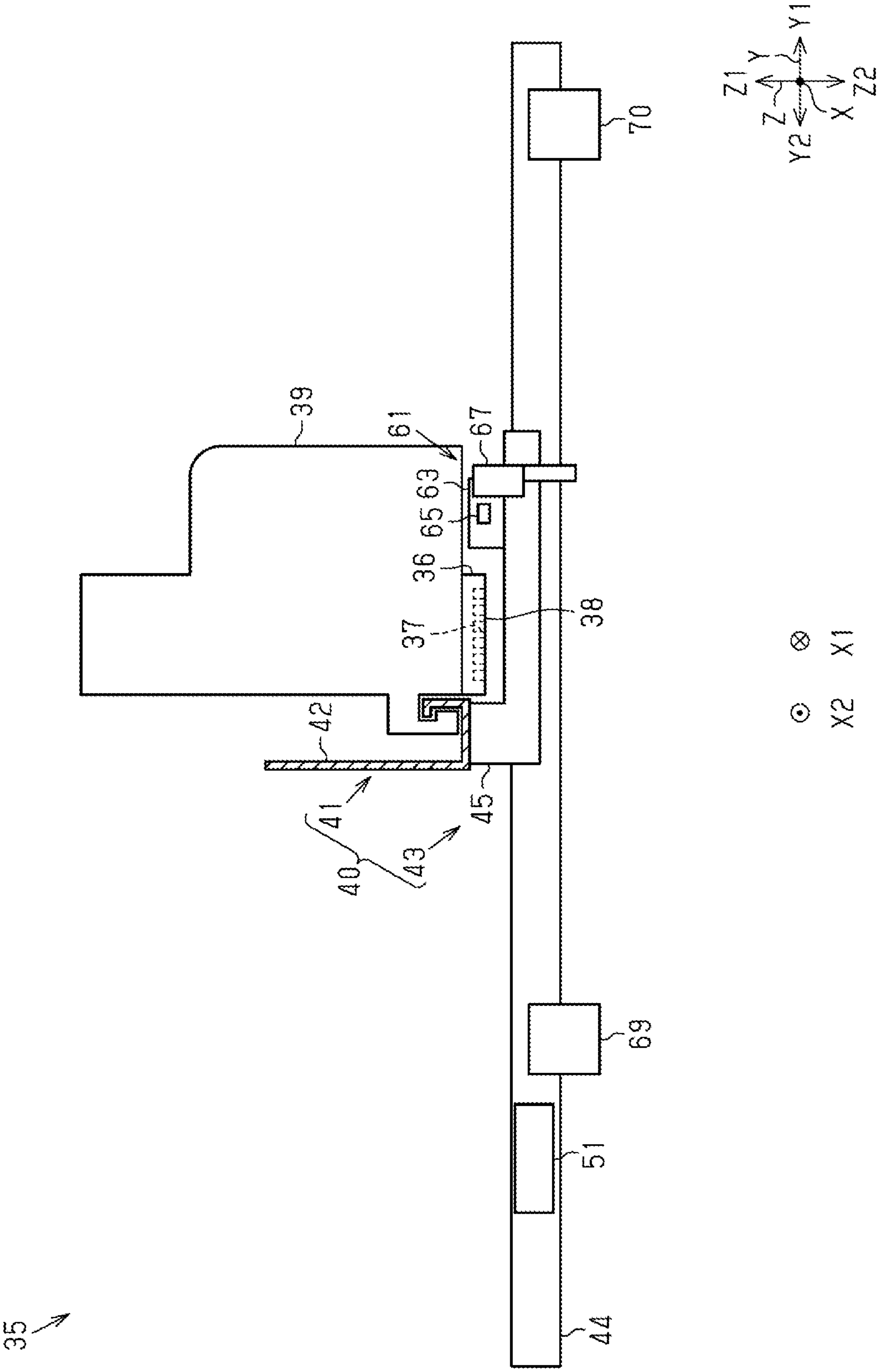
FIG. 4 is a schematic view of the printing unit illustrating the first moving unit moving forward.

As illustrated in FIG. 4, when the first moving unit 41 moves from the standby position Pw to the front side Y1, the cover 67 moves to the front side Y1 while remaining in the exposure state. In other words, the interference object sensor 61 moves to the front side Y1 in a state in which the interference object can be detected.

As illustrated in FIG. 5, the cover 67 comes into contact with the second switching unit 70 before the first moving unit 41 moves to the end position Pe. The first moving unit 41 moves to the front side Y1 in a state in which the movement of the cover 67 is stopped by the second switching unit 70. As a result, the cover 67 moves relative to the interference object sensor 61 and causes the detector 65 to be in the shielded state.

Figure 6:
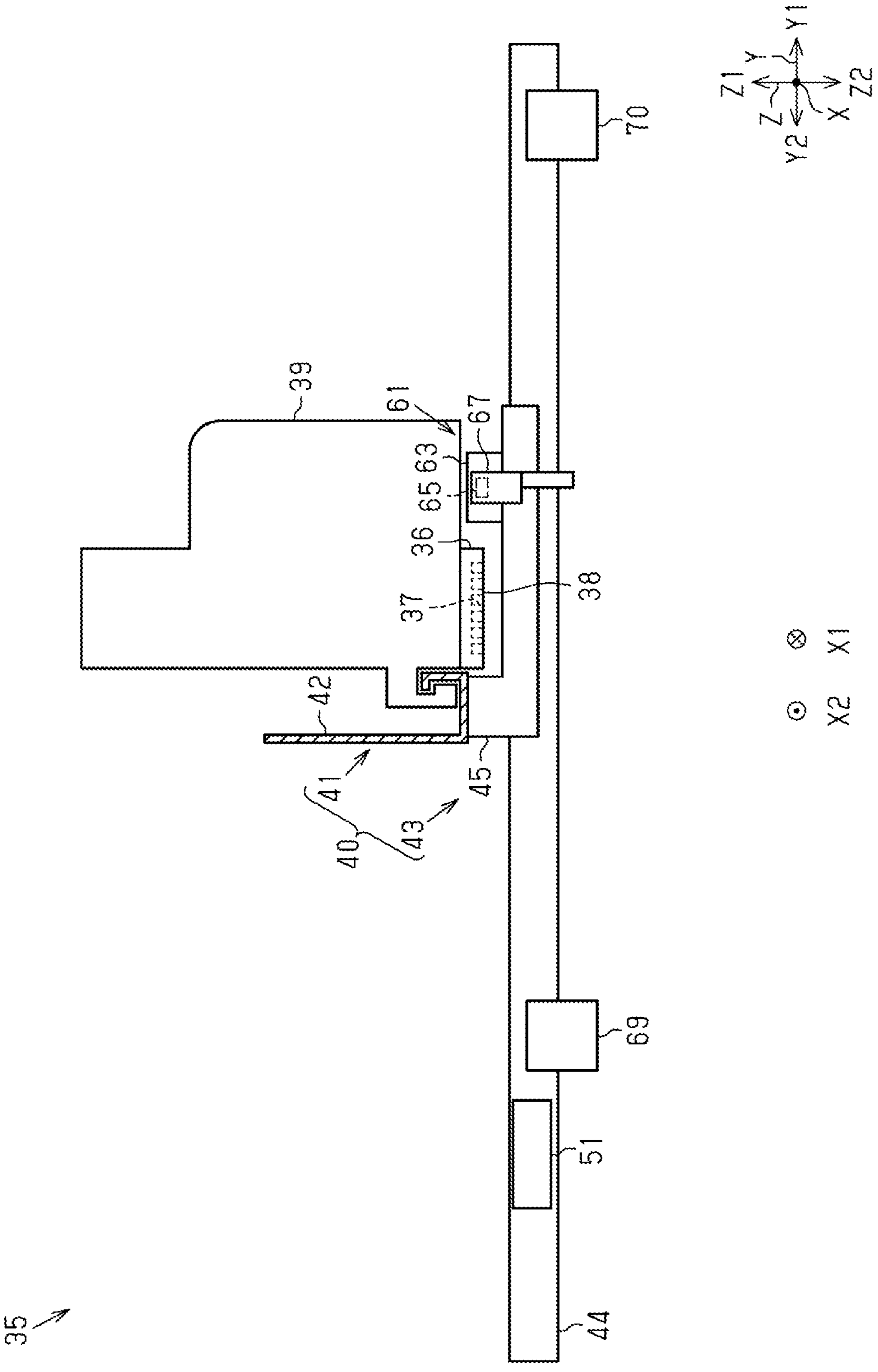
FIG. 6 is a schematic view of the printing unit illustrating the first moving unit moving rearward.

As illustrated in FIG. 6, when the first moving unit 41 moves from the end position Pe to the rear side Y2, the cover 67 moves to the rear side Y2 while the shielded state is maintained. In other words, the interference object sensor 61 moves to the rear side Y2 in a state in which the detector 65 is protected from the mist or the like.

As illustrated in FIG. 3, the cover 67 comes into contact with the first switching portion 69 before the first moving unit 41 moves to the standby position Pw. The first moving unit 41 moves to the rear side Y2 in a state in which the movement of the cover 67 is stopped by the first switching unit 69. As a result, the cover 67 moves relative to the interference object sensor 61 and causes the detector 65 to be in the exposed state.

When the first moving unit 41 is positioned at the standby position Pw, the interference object sensor 61 is further to the rear side Y2 than the medium support unit 28. In other words, the interference object sensor 61 is positioned at a position separated toward the rear side Y2 from the medium support unit 28 at which the mist accompanying the printing is likely to be generated. Thus, even if the detector 65 stands by in the exposed state, dirt is less likely to adhere to the detector 65.

When the first moving unit 41 is positioned at the standby position Pw, the carriage 39 and the head 36 can be positioned at the home position Ph. The head 36 positioned at the home position Ph is capped by the cap 51.

When the opening/closing cover 22 is opened and the medium is set, the first moving unit 41 may be positioned at the standby position Pw, the carriage 39 may be positioned at the home position Ph, and the medium support unit 28 may be positioned at the uppermost position.

As illustrated in FIG. 4, when the opening/closing cover 22 is closed and the printing is started, the control unit 53 moves the cap 51 to the lower side Z2 and, at the same time, moves the first moving unit 41 to the front side Y1. The cover 67 moves to the front side Y1 while maintaining the detector 65 in the exposure state.

When the amount of light received by the photoreceptor unit 63 is less than a predetermined threshold value, the control unit 53 may determine that there is the interference object interfering with the head 36 when the head 36 is moved as it is to the front side Y1. When the interference object sensor 61 detects the interference object, the control unit 53 moves the medium support unit 28 to the lower side Z2. The control unit 53 lowers the medium support unit 28 so that the medium supported by the medium support unit 28 does not interfere with the head 36.

The control unit 53 repeats the detection of the interference object and the lowering of the medium support unit 28 until the first moving unit 41 moves to the end position Pe. The control unit 53 adjusts a distance between the nozzle surface 38 and the medium in the vertical direction Z to a distance suitable for the printing. During a period in which the first moving unit 41 moves to the end position Pe, the carriage 39 maintains a stopped state and does not perform the printing.

As illustrated in FIG. 5, when the first moving unit 41 is positioned at the end position Pe, the cover 67 causes the detector 65 to be in the shielded state.

As illustrated in FIG. 6, when the first moving unit 41 moves from the end position Pe to the rear side Y2, the carriage 39 reciprocates in the width direction X and causes the head 36 to face the medium. The head 36 faces the medium supported by the support surface 29 and ejects the liquid. During the printing in which the liquid is ejected onto the medium, the head 36 may also perform the flushing operation in which the liquid is ejected to the flushing portion 48. Even if the mist is generated due to the ejection of the liquid, the mist is unlikely to adhere to the detector 65 because the cover 67 has established the shielded state.

The printing apparatus 10 may perform the printing by performing a reciprocating movement in the front-rear direction Y a plurality of times. For example, printing with white ink may be performed in the first reciprocating movement. For example, printing with color ink may be performed in the second reciprocating movement. The printing apparatus 10 may also perform the detection of the interference object during the second movement.

The maintenance unit 47 may perform periodic maintenance. For example, the maintenance unit 47 may perform maintenance when the power of the printing apparatus 10 is turned on, before the printing, after the printing, or the like. As the maintenance, the maintenance unit 47 may perform at least one of the flushing operation, a suction cleaning operation, and the wiping operation.

The maintenance unit 47 may perform the maintenance after the first moving unit 41 has moved to the end position Pe and before the first moving unit 41 returns to the standby position Pw. In other words, the maintenance unit 47 may cause the detector 65 to be in the shielded state, and perform the maintenance.

Effects of Embodiment

Advantages of the present embodiment will be described.

(1) The cover 67 can switch the detector 65 to the shielded state and to the exposed state. By causing the detector 65 to be in the shielded state, it is possible to reduce the mist adhering to the detector 65. Thus, it is possible to reduce the time and effort for the maintenance of the interference object sensor 61.

(2) The interference object sensor 61 is provided at the moving unit 40 at which the head 36 is mounted. Since the interference object sensor 61 moves together with the head 36, there is a concern that the surroundings of the interference object sensor 61 may become an environment with a large amount of mist. However, since the detector 65 can be shielded by the cover 67, the mist adhering to the detector 65 can be reduced.

(3) The state of the cover 67 is switched in accordance with the movement of the first moving unit 41. Therefore, the configuration can be simplified as compared with a case in which a mechanism for switching the state of the cover 67 is separately provided.

(4) The carriage 39 moves the head 36 in the width direction X. Thus, compared to a case in which the head 36 is provided over the width direction X, the head 36 can be downsized.

(5) When the mist adheres to the interference object sensor 61 including the light projecting unit 62 and the photoreceptor unit 63, there is a concern that the light may be blocked by the mist and the interference object cannot be detected. In this regard, since the adherence of the mist can be reduced by the cover 67, even the interference object sensor 61 that is easily affected by mist can be adopted.

Modified Examples

The embodiment can be modified and implemented as follows. The embodiment and the following modified examples can be combined and implemented insofar as no technical contradictions arise.

The printing unit 35 may adjust the position of the medium when moving to the rear side Y2, and perform the printing when moving to the front side Y1. The cover 67 may cause the detector 65 to be in the exposed state when moving to the rear side Y2 and cause the detector 65 to be in the shielded state when moving to the front side Y1.

The printing unit 35 may perform the printing when the head 36 moves in any one of the first width direction X1 and the second width direction X2, or may perform the printing both when the head 36 moves in the first width direction X1 and when the head 36 moves in the second width direction X2.

The head 36 may include the nozzle surface 38 that is parallel to the horizontal plane or may include the nozzle surface 38 that is inclined with respect to the horizontal plane.

In the state in which the printing unit 35 is positioned at the standby position Pw, the interference object sensor 61 may be positioned at the same position as the rear end of the medium support unit 28 or may be positioned further to the front side Y1 than the rear end of the medium support unit 28. The interference object sensor 61 may detect the interference object before the first moving unit 41 starts moving to the front side Y1.

The light projecting unit 62 and the photoreceptor unit 63 may be provided at positions displaced with respect to each other in the front-rear direction Y.

The cover 67 may be provided at one of the light projecting unit 62 or the photoreceptor unit 63.

The arrangement of the light projecting unit 62 and the photoreceptor unit 63 may be reversed. For example, the photoreceptor unit 63 may be provided at the one of the support portions 45 positioned between the medium support unit 28 and the liquid supply unit 32. The light projecting unit 62 may be provided at the other of the support portions 45 adjacent to the maintenance unit 47 in the width direction X.

The interference object sensor 61 may be a reflective sensor. In the interference object sensor 61, the light projecting unit 62 and the photoreceptor unit 63 may be integrally formed. The interference object sensor 61 may detect the interference object by the photoreceptor unit 63 receiving light projected from the light projecting unit 62 and reflected by the interference object. The interference object sensor 61 may be provided at one of the pair of support portions 45.

The interference object sensor 61 is not limited to the optical sensor and may be selected as desired, such as an ultrasonic sensor and the like.

The moving unit 40 may have a configuration in which the second moving unit 43 is not provided. The relative movement between the medium support unit 28 and the head 36 in the front-rear direction Y may be performed by moving the medium support unit 28.

The head 36 may be configured as a serial type, or may be configured as a line type. The serial type head 36 performs the printing while reciprocating in the width direction X. The line type head 36 is provided over the width direction X. When the head 36 is of the line type, the printing apparatus 10 may have a configuration in which the carriage 39 is not provided.

The printing apparatus 10 may be provided with a cover moving mechanism that moves the cover 67. The control unit 53 may perform the switching between the shielded state and the exposed state by controlling the cover moving mechanism.

The cover 67 may perform the switching between the shielded state and the exposed state by sliding in the vertical direction Z. The cover 67 may perform the switching between the shielded state and the exposed state by rotating about an axis. The cover 67 may perform the switching between the shielded state and the exposed state by expanding and contracting.

The printing apparatus 10 may be provided with a plurality of the covers 67 for the single detector 65. For example, the plurality of covers 67 may establish the shielded state by bringing the cover 67 positioned at the front side Y1 and the cover 67 positioned at the rear side Y2 close to each other, and may establish the exposed state by separating the covers 67 from each other. The plurality of covers 67 may constitute an iris diaphragm mechanism, for example. In other words, the plurality of covers 67 may perform the switching between the shielded state and the exposed state by rotating to move relative to each other.

The printing apparatus 10 may be provided with a sensor moving mechanism that moves the interference object sensor 61. The control unit 53 may move the interference object sensor 61 by controlling the sensor moving mechanism.

The interference object sensor 61 may be provided at the carriage 39. The first moving unit 41 may detect the interference object, by the carriage 39 being moved in the width direction X while the first moving unit 41 is still positioned at the standby position Pw.

For example, the medium is not limited to the T-shirt, a polo shirt, or the like, and may be a sweatshirt, a hooded sweatshirt, or the like, for example, or may be a medium such as clothing. Further, the medium having flexibility is adopted as the medium, but the medium is not limited to this example, and a medium having no flexibility, such as a smartphone case printed using UV ink, may be adopted, for example.

The printing apparatus 10 may be configured to eject ink as an example of the liquid, but may be configured to eject a liquid other than ink. In other words, the liquid can be arbitrarily selected as long as it can perform the printing on the medium by adhering to the medium.

Definition

As used herein, the phrase "at least one of" means one or more of specific alternatives. As an example, the phrase "at least one of" as used herein means only one alternative or both of two alternatives, when the number of alternatives is two. As another example, the phrase "at least one of" as used herein means only one alternative, or any combination of two or more alternatives, when the number of alternatives is three or more.

Supplementary Description

Hereinafter, technical concepts and effects thereof that are understood from the above-described exemplary embodiments and modified examples are described.

(A) A printing apparatus includes a head configured to face a medium supported by a medium support unit and to eject a liquid, an interference object sensor including a detector configured to detect an interference object with the head, and a cover configured to switch the detector to a shielded state and to an exposed state.

According to this configuration, the cover can switch the detector to the shielded state and to the exposed state. The detector can reduce mist adhering to the detector as a result of the detector being caused to be in the shielded state. Thus, it is possible to reduce the time and effort for maintenance of the interference object sensor.

(B) The printing apparatus may include a moving unit carrying the head, the moving unit being configured to move in a second direction in a state of straddling the medium support unit in a first direction. The interference object sensor may be provided at the moving unit.

According to this configuration, the interference object sensor is provided at the moving unit on which the head is mounted. Since the interference object sensor moves together with the head, there is a concern that the surroundings of the interference object sensor may become an environment with a large amount of mist. However, since the detector can be caused to be in the shielded state by the cover, mist adhering to the detector can be reduced.

(C) In the printing apparatus, the cover may switch the detector between the shielded state and the exposed state in accordance with a movement of the moving unit.

According to this configuration, a state of the cover is switched in accordance with the movement of the moving portion. Therefore, the configuration can be simplified compared with a case in which a mechanism for switching the state of the cover is separately provided.

(D) The printing apparatus may include a carriage configured to move the head in the first direction at the moving unit.

According to this configuration, the carriage moves the head in the first direction. Thus, it is possible to reduce the size of the head compared to a case in which the head is provided over the first direction.

(E) In the printing apparatus, the interference object sensor may include a light projecting unit and a photoreceptor unit. When the mist adheres to the interference object sensor including the light projecting unit and the photoreceptor unit, there is a concern that light may be blocked by the mist and the interference object cannot be detected. In this regard, according to this configuration, since the adherence of the mist can be reduced by the cover, even the interference object sensor that is easily affected by the mist can be adopted.

What is claimed is:

1. A printing apparatus comprising:

a head configured to face a medium supported by a medium support unit and to eject a liquid;

an interference object sensor including a detector configured to detect an interference object with the head;

a cover configured to switch the detector between a shielded state and an exposed state; and a moving unit carrying the head, the moving unit being configured to move, wherein the cover switches the detector between the shielded state and the exposed state in accordance with a movement of the moving unit.

2. The printing apparatus according to claim 1, wherein the moving unit is configured to move in a second direction in a state of straddling the medium support unit in a first direction, and the interference object sensor is provided at the moving unit.

3. The printing apparatus according to claim 2, comprising:

a carriage configured to move the head in the first direction, at the moving unit.

* * * * *